US006935170B2

(12) United States Patent
Saunders et al.

(10) Patent No.: US 6,935,170 B2
(45) Date of Patent: Aug. 30, 2005

(54) TIRE INSPECTION APPARATUS

(76) Inventors: Bruce L Saunders, 189 E. Countyline Rd., Calimesa, CA (US) 92320; Jerry M. Hignight, P.O. Box 713, Morongo, CA (US) 92256

( * ) Notice: Subject to any disclaimer, the term of this patent is extended or adjusted under 35 U.S.C. 154(b) by 0 days.

(21) Appl. No.: 10/702,872

(22) Filed: Nov. 5, 2003

(65) Prior Publication Data

US 2005/0092075 A1 May 5, 2005

(51) Int. Cl.[7] ............................................. G01M 17/02
(52) U.S. Cl. ............................. 73/146; 73/700; 340/605
(58) Field of Search ....................... 73/146, 600, 146.2, 73/146.3, 146.4, 146.5, 146.8; 340/605

(56) References Cited

U.S. PATENT DOCUMENTS

| 3,882,717 A | * | 5/1975 | McCauley | 73/600 |
| 4,372,366 A | * | 2/1983 | Dugger | 157/13 |
| 4,488,430 A | * | 12/1984 | Fujimoto et al. | 73/146 |
| 4,491,013 A | * | 1/1985 | Bubik | 73/146 |
| 4,520,307 A | | 5/1985 | Weiss et al. | |
| 4,936,138 A | * | 6/1990 | Cushman et al. | 73/146 |
| 4,969,350 A | | 11/1990 | Fogal, Sr. | |
| 5,095,744 A | | 3/1992 | Macecek | |
| 5,798,696 A | * | 8/1998 | Wong | 340/605 |

* cited by examiner

Primary Examiner—Edward Lefkowitz
Assistant Examiner—Andre Allen
(74) Attorney, Agent, or Firm—James E. Brunton, Esquire

(57) ABSTRACT

A tire inspection apparatus for detecting defects in tubeless truck tires. The apparatus includes a support base having first, second and third supports, the first and third supports being pivotable between a first position and a second position. A wheel assembly is rotatably supported on each of the first and third supports of the support base with each wheel assembly having an upper portion and a removably interconnected, axially aligned second portion. A connector arrangement is provided on each wheel assembly for removably interconnecting together the first and second portions of the assembly and a lifting apparatus is mounted on the second support of the support base for lifting the first portion of the wheel assembly and for moving the first portion of the wheel assembly into and out of alignment with the second portion of the wheel assembly.

10 Claims, 10 Drawing Sheets

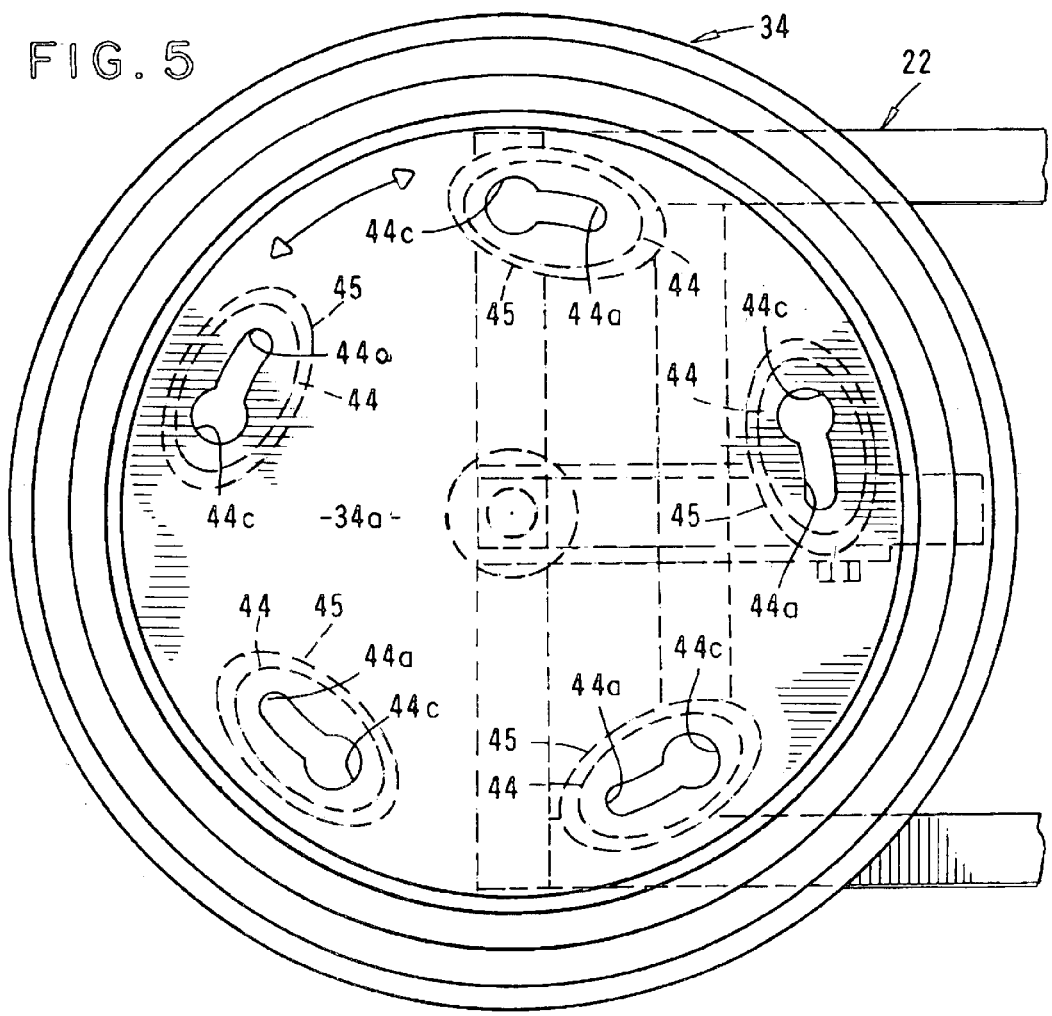
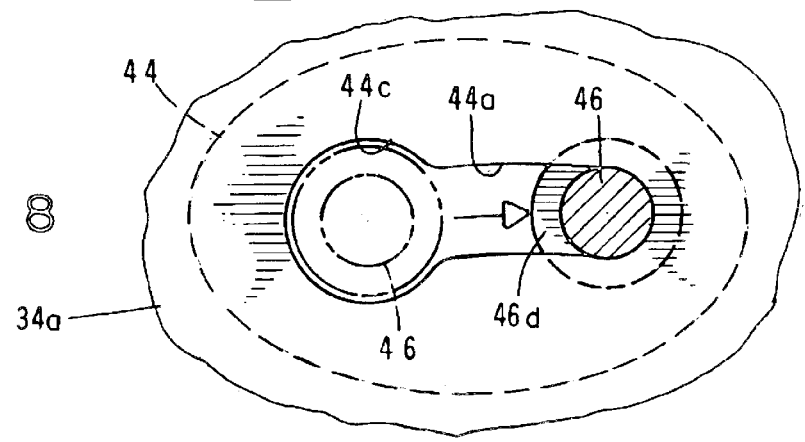

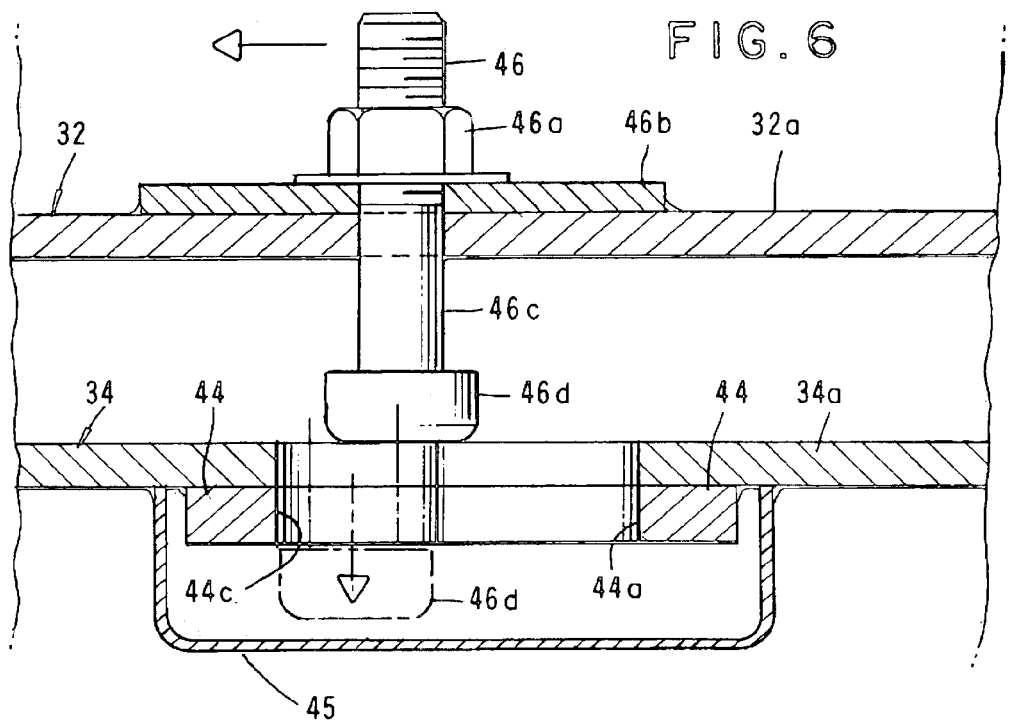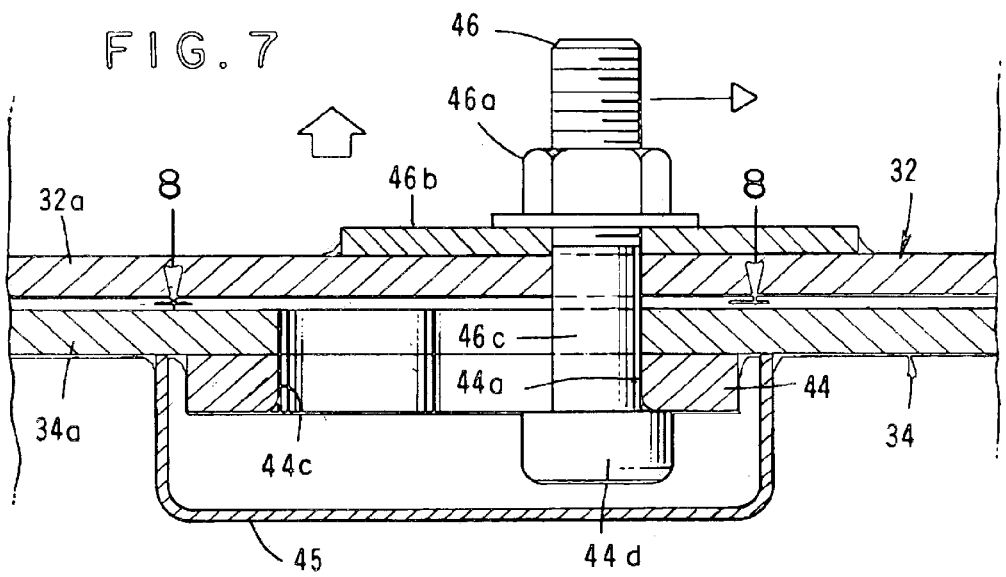

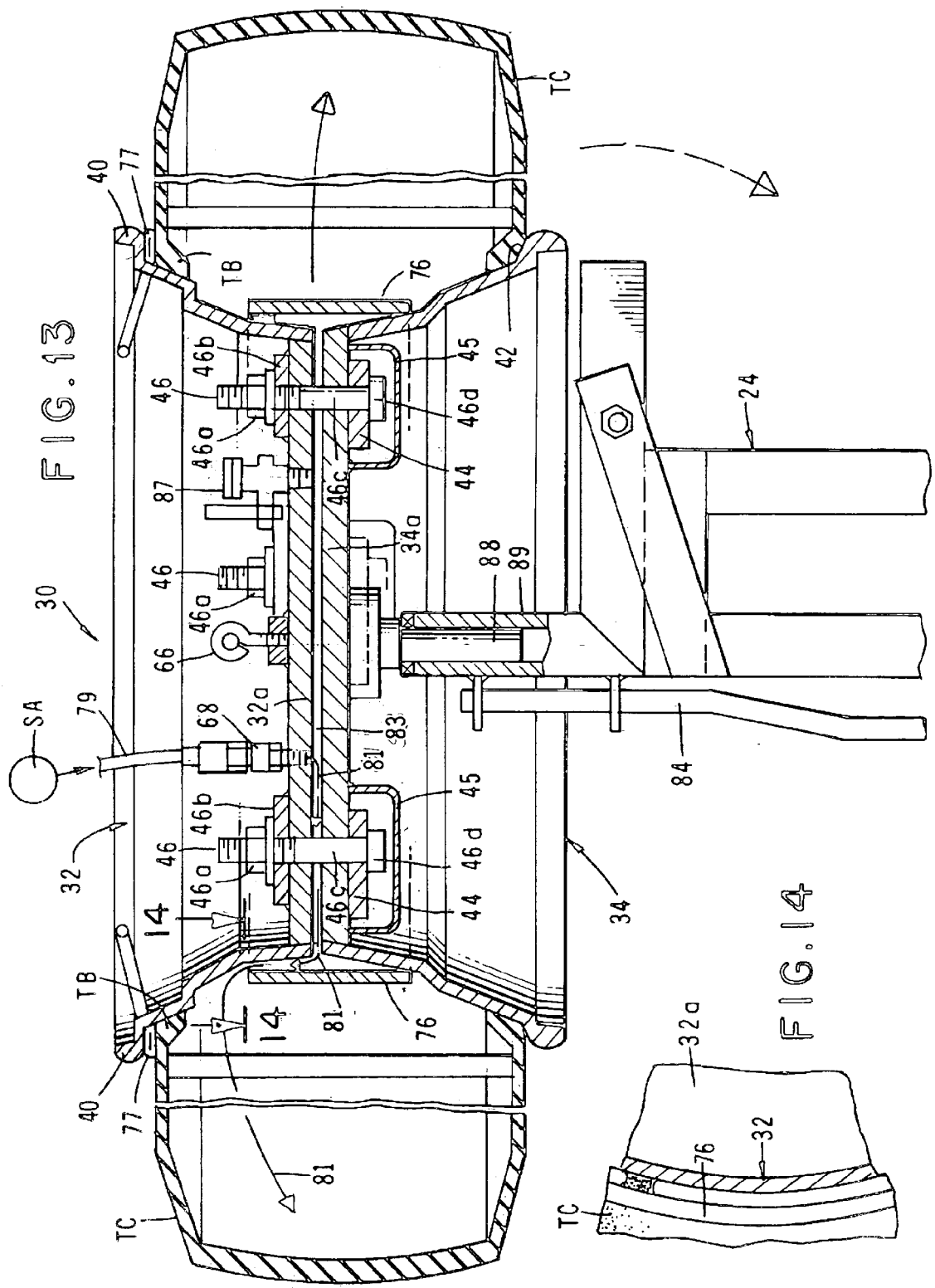

TIRE INSPECTION APPARATUS

BACKGROUND OF THE INVENTION

1. Field of the Invention

The present invention relates generally to tire inspection equipment. More particularly, the invention concerns an apparatus for inspecting used truck tires prior to retreading.

2. Discussion of the Prior Art

A number of different types of equipment and processes have been suggested in the past for inspection of both new and used tires. Of particular interest has been the development of apparatus for use in the inspection of used tires to find hidden irregularities or defects prior to retreading the used tire casing. If a used tire casing, which has undetected defects is retreaded, pressurized air in the tire can leak through the defect and undesirably form a pocket between the outer surface of the casing and the new tread. Such a pocket can produce potentially dangerous steering, vibration and misalignment problems. Additionally, a buildup in pressure between the casing and the new tread can cause separation of the tread and create a potentially catastrophic condition.

Obviously, if a defect in the tire is discovered after the retreading operation has been accomplished, the tire must be discarded and in no event should be mounted on a vehicle because of the potential danger involved. In such an instance, the cost of the retreading materials and the labor involved in the retreading operation must be absorbed by the retreader.

In the past, defects in tires, such as nail holes, punctures and like casing defects were generally found either by visual inspection of the tire or through the use of highly sophisticated and often expensive detection equipment. By way of example, U.S. Pat. No. 5,095,744 issued to Macecek, et al. discloses tire inspection equipment having a movable energy transmitter assembly and a movable energy receiver assembly to detect energy from the transmitter assembly passing through a tire casing. In the Macecek, et al equipment, sonic or ultrasonic energy is sometimes used to find hidden defects or irregularities in a used tire casing. At other times and for or other applications electromagnetic energy or a combination of electromagnetic and sonic or ultrasonic energy is used.

U.S. Pat. No. 4,969,350 issued to Fogal, Sr. discloses a method of locating defects in tires prior to recapping in which the tire to be retreaded or recapped is placed upon an expandable mandrel and a liquid material which accentuates defects when influenced by predetermined electromagnetic wavelengths is introduced into the interior of the tire. The expandable mandrel or hub of the Fogal, Sr. equipment is expanded and the interior of the tire is pressurized after which the hub and tire are rotated. During this rotation the material is uniformly applied over the entire interior surface of the tire and due to the internal pressure, the liquid is forced to migrate through any defect toward and to the tire exterior. As the tire continues to rotate, light of the predetermined electromagnetic wavelengths corresponding to those which influence the coating material is applied to the exterior surface of the coated tire whereby any coating material which has migrated through a defect in the tire to the exterior is accentuated and thus detected.

Other prior art examples of tire inspection equipment and processes are discussed in U.S. Pat. No. 4,936,138 issued to Cushman, et al. and in U.S. Pat. No. 4,520,307 issued to Weiss, et al. The Weiss et al patent discloses a high-voltage, non-destructive inspection system for detecting nails, and/or cuts and holes in vehicle tires. The system employs a high-voltage head mounted within the tire and a reference head outside the tire opposite to the high-voltage head. The high-voltage head and reference head span the tire tread axially. The inspection is performed in one revolution of the tire. High-voltage pulses are impressed upon the high-voltage head, and the amplitude and pulse widths are variably selected, commensurate with the type of tire being tested. When a cut, hole or a nail in the tire passes between the high-voltage head and the reference head, an electric arc forms and current passes through the tire. This arc can be visually observed and also electronically detected. Upon detection, via an electronic detection circuit, a lamp lights and the tire rotation is stopped, thus facilitating location of the flaw, via a manual mode.

U.S. Pat. No. 4,936,138 issued to Cushman et al. discloses an apparatus for inspecting a tire for structural defects as the tire is rotated on a stand which comprises a movable transducer transmitter for directing a plurality of successive collimated bursts of ultrasonic energy against the tire surface, the bursts passing through the tire and forming inspection areas having the same diameter and overlapping each other as the tire is rotated during an inspection cycle. A movable receiver transducer located on the other side of the tire from the transmitter is constantly positioned to receive the collimated ultrasonic energy that passes through each inspection area. Coordination control elements are provided for moving the transmitter transducer and the receiver transducer from one side of the tire to the other generally parallel to its axis of rotation while successive ultrasonic bursts are directed through the tire as it rotates during each inspection test and while maintaining substantially the same distance between the transducers for each burst. The strength of the energy received by the receiver transducer is evaluated for each burst when the evaluation indicates that a defect is present and a visual indicator is triggered to identify the location of the structural defect in the tire being inspected.

As can be appreciated from the discussion in the preceding paragraphs, many of the prior art tire inspection methods and apparatus are quite complicated, very expensive and often not well-suited for use in the inspection of large, heavy and difficult to handle truck tires. Accordingly, it is an object of the present invention to provide an improved tire inspection apparatus that is of simple construction, is easy to use and is well-suited for the inspection of relatively heavy truck tires.

SUMMARY OF THE INVENTION

By way of summary, the present invention concerns a tire inspection apparatus for detecting defects in tubeless tires having sidewalls and first and second annular tire beads. In one form of the invention, the apparatus comprises a support base having first and second supports, the first support being pivotable between a first position and a second position. A wheel assembly is rotatably supported on the first support of the support base, the wheel assembly having a first portion and a removably interconnected, axially aligned second portion, the lower portion having a lower wheel flange against which the lower tire bead seats and the upper portion having an upper wheel flange against which the upper tire bead seats. A connector arrangement is provided on the wheel assembly for removably interconnecting together the first and second portions of the assembly and a lifting apparatus carried by the second support of the support base is provided for lifting the first portion of the wheel assembly and for moving the first portion of the wheel assembly into and out of alignment with the second portion of the wheel assembly. An inflation system is provided for inflating the tubeless tire when the tire is positioned between the upper and lower wheel flanges of the wheel assembly and an emersion tank is positioned proximate the first support of the support base for receiving at least a portion of the inflated tire when the first support of the support base is pivoted into its second position.

With the foregoing in mind, it is an object of the present invention to provide an apparatus for inspecting truck tires, which is of a simple, relatively inexpensive construction and one that can be used by relatively unskilled workman with a minimum of training.

Another object of the invention is to provide a truck tire inspection apparatus of the aforementioned character that will positively and reliably detect defects truck tire casings such as nail holes, punctures and like casing defects.

Another object of the present invention is to provide an apparatus of character described in the preceding paragraphs, which is ideally suited for use in inspecting truck tire casings prior to retreading.

Another object of the invention is to provide an improved truck tire inspection apparatus for expeditiously testing truck tires of different sizes.

Yet another object of the present invention is to provide an apparatus for inspecting truck tire casings which is highly cost effective to manufacture and to maintain.

BRIEF DESCRIPTION OF THE DRAWINGS

FIG. 5 is a view taken along lines 5—5 of FIG. 3.

FIG. 6 is an enlarged, cross-sectional view of one of the connector assemblies of the invention for interconnecting the upper and lower portions of the wheel assembly.

FIG. 7 is an enlarged, cross-sectional view, similar to FIG. 6 is showing the connector assembly moved into a locked position.

FIG. 8 is a cross-sectional view taken along lines 8—8 of FIG. 7.

FIG. 13 is an enlarged, cross-sectional view similar to FIG. 12, but showing the upper portion of the wheel assembly moved into locking engagement with the lower portion of the wheel assembly.

FIG. 14 is a cross-sectional view taken along lines 14—14 of FIG. 13.

DESCRIPTION OF THE INVENTION

Figure 1:
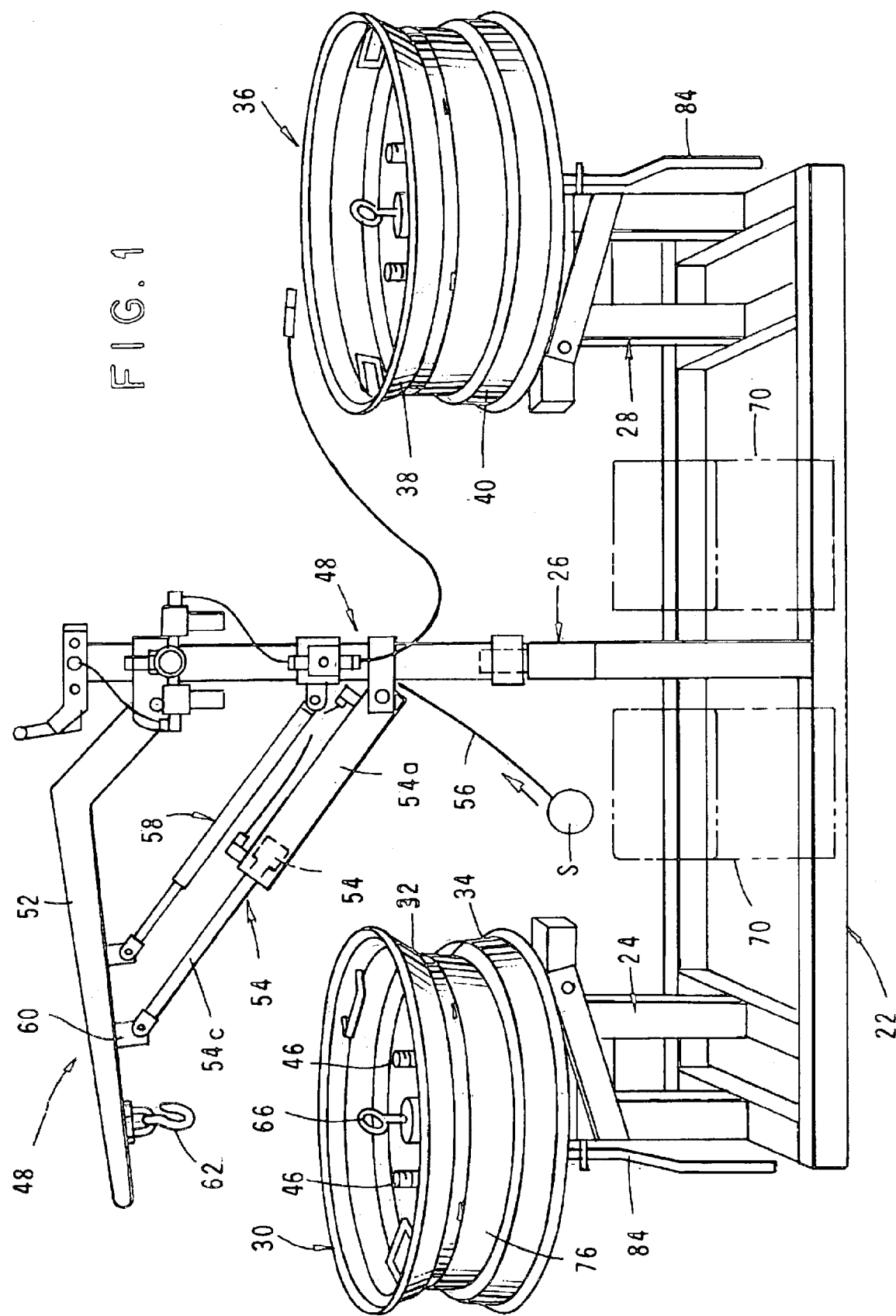
FIG. 1 is a generally perspective view of one form of the tire inspection apparatus of the present invention.
Figure 15:
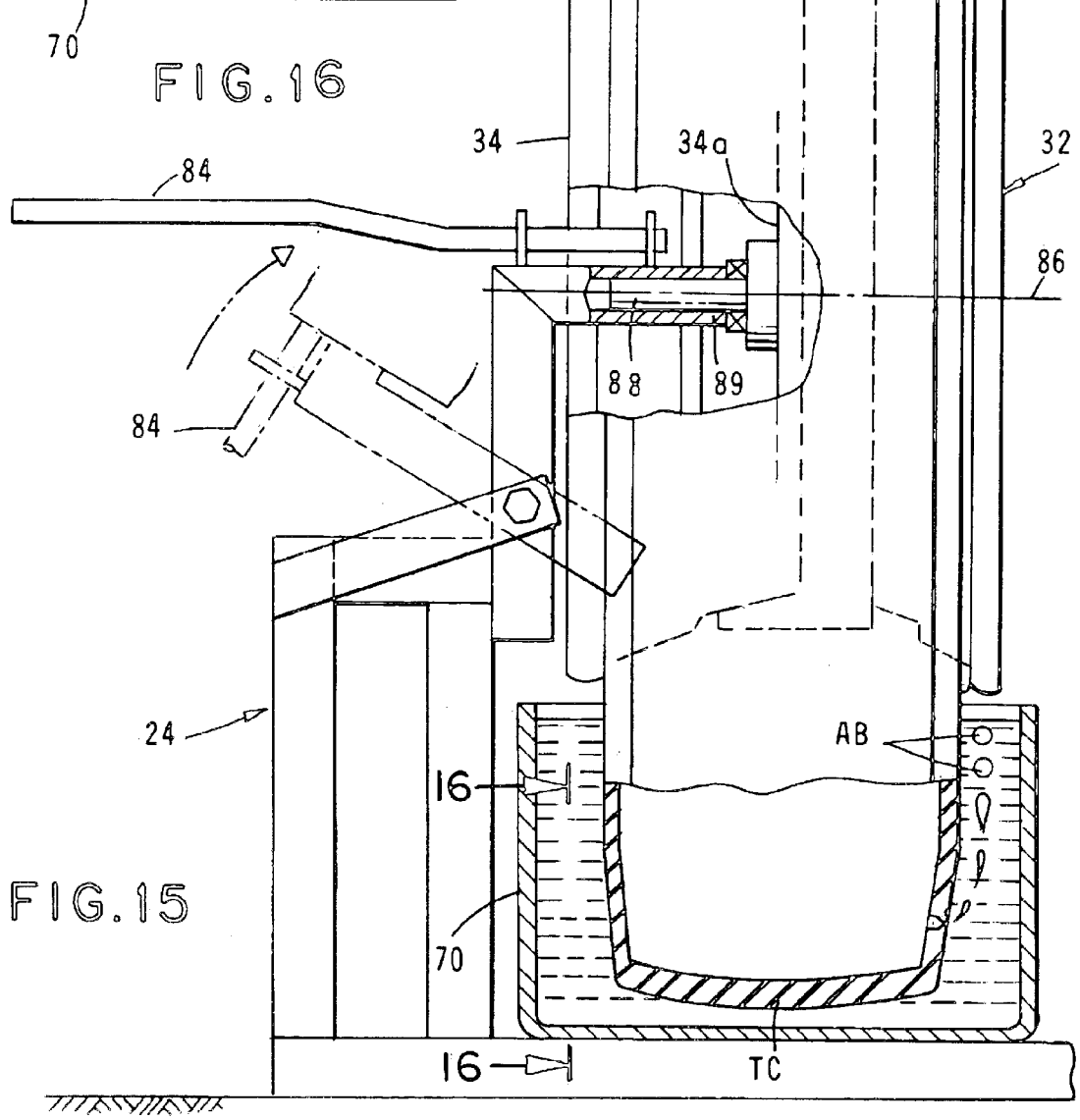
FIG. 15 is a view similar to FIG. 14, which is partially in cross-sectional to show internal construction and which illustrates the pivotal movement of the wheel and tire assembly shown in FIG. 13 into a generally vertical, leak testing configuration.

Referring to the drawings and particularly to FIGS. 1 through 5, one form of the tire inspection apparatus of the invention for detecting defects in tubeless tires is there shown. As been seen in FIG. 1, the apparatus here comprises a support base 22 having spaced-apart first, second and third supports 24, 26 and 28 respectively. As indicated in FIGS. 1, 13, and 15 and, as will be further described hereinafter, the first and third supports 24 and 28 are pivotable from a first position shown in FIG. 1 to a second tire inspection position such as that illustrated in FIG. 15.

Supported on first support 24 of support base 22 is a first wheel assembly 30 having an upper or first portion 32 and a removably interconnected, axially aligned second or lower portion 34 which is rotatable relative to the first support 24 (see FIG. 13). Supported on third support 28 is a second wheel assembly 36 having a first or upper portion 38 and a removably interconnected, axially aligned second or lower portion 40. First and second wheel assemblies 30 and 36 are of substantially similar construction, but each is designed to accept a tire of a different size. For example, first wheel assembly 30 is designed to accept an 11 inch tread width, 22.5 inch diameter of tire bead, while second wheel assembly 36 is designed to accept an 11 inch tread width, 24.5 inch diameter of tire bead.

Figure 2:
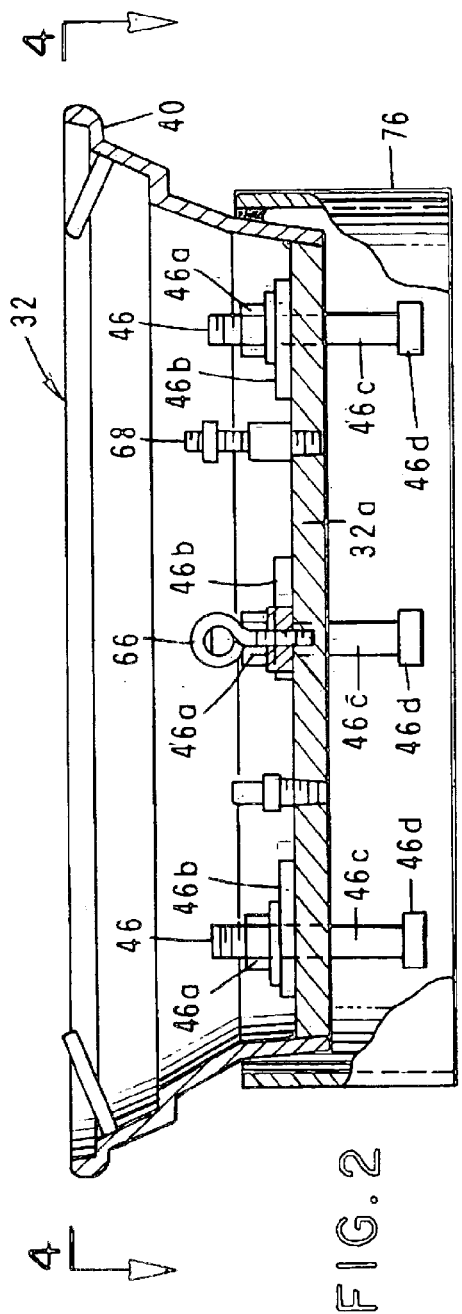
FIG. 2 is a greatly enlarged, cross-sectional view of the upper portion of one of the wheel assemblies of the apparatus of the invention.
Figure 3:
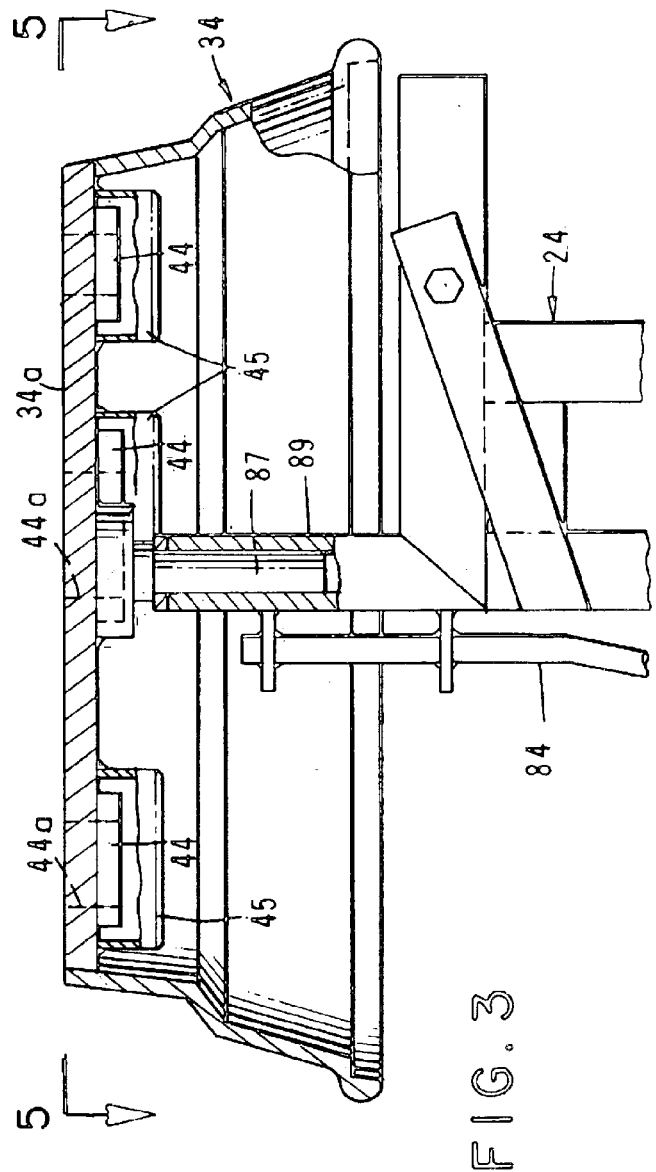
FIG. 3 is a greatly enlarged, cross-sectional view of the lower portion of one of the wheel assemblies of the apparatus of the invention.

For purposes of simplicity of description, only the construction and operation of the first wheel assembly 30 will be discussed, it being understood that the construction and operation of the second wheel assembly 36 is substantially identical save that the assemblies are of a different size. As shown in FIG. 2, the upper portion 32 of wheel assembly 30 has an upper wheel flange 40 against which the upper tire bead seats. Similarly, as shown in FIG. 3, the lower portion 34 of wheel assembly 30 has a lower wheel flange 42 against which the lower tire bead seats.

To removably interconnect upper and lower portions 32 and 34 of wheel assembly 30, novel connector means are provided. In the present form of the invention these novel connector means comprise a plurality of circumferentially spaced apart connector brackets 44, which, is shown in FIGS. 3, 6, and 7, are connected to the base plate 34a of second wheel portion 34. The connector means also comprise a plurality of circumferentially spaced-apart threaded studs 46 that are adapted to mate with brackets 44 and are connected to the base plate 32a of first wheel portion 32 by nuts 46a and support plates 46b in the manner shown in FIGS. 2, 6, and 7. As been seen in FIGS. 5 and 8, each of the connector the brackets 44 is housed within housing 45 and has provided therein a generally keyhole shaped opening 44a. Each of the studs 46 has a shank portion 46c and an interconnected head portion 46d (FIG. 2). As depicted in FIGS. 6, 7, and 8, head portion 46d of each of the studs is closely, lockably receivable within a selected one of the generally keyhole shaped openings 44a provided in spaced apart connector brackets 44.

Figure 10:
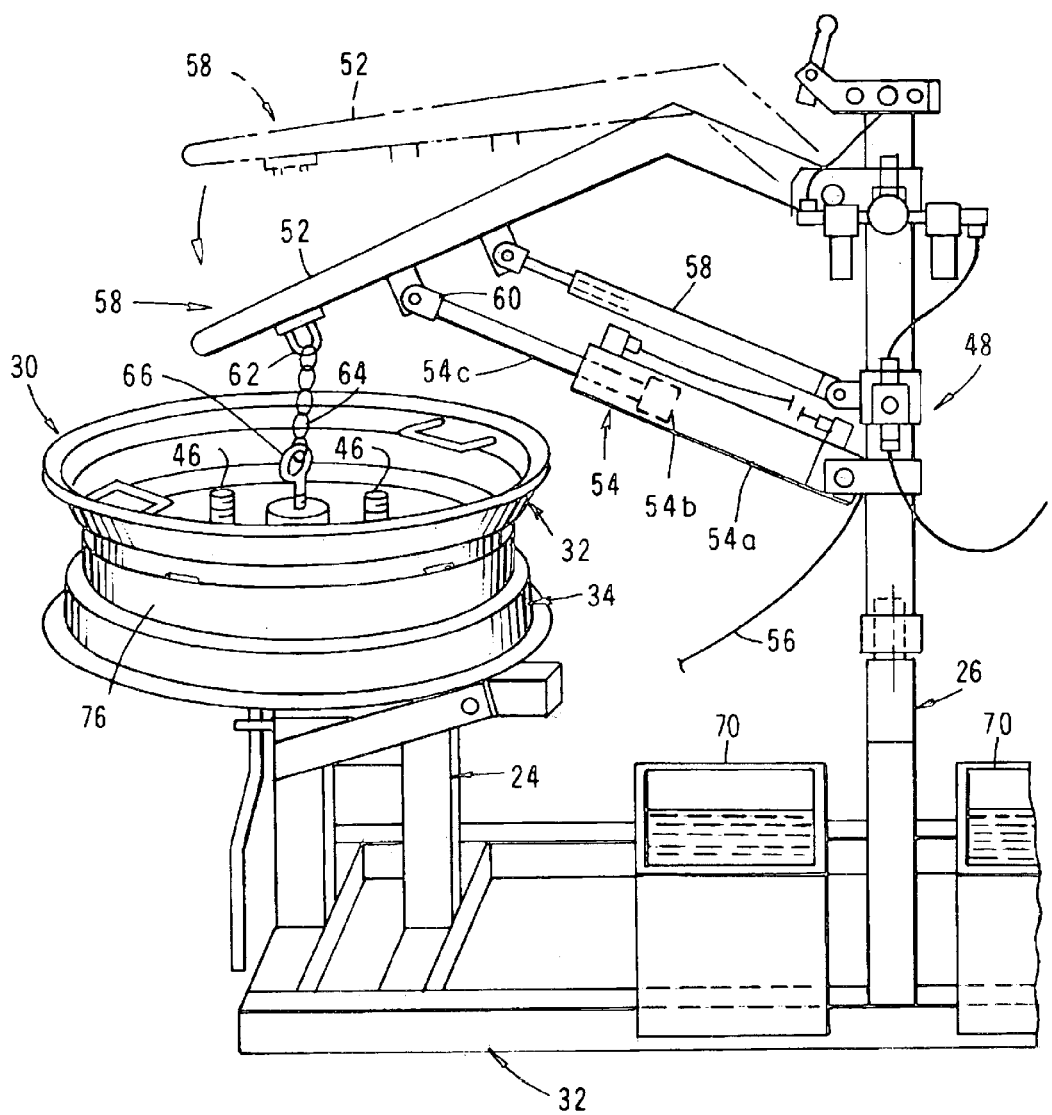
FIG. 10 is an enlarged, fragmentary, generally perspective view of the left-hand portion of the apparatus shown in FIG. 1 illustrating the step of interconnecting the air lifting mechanism of the apparatus of the invention with the upper portion of the wheel assembly.
Figure 11:
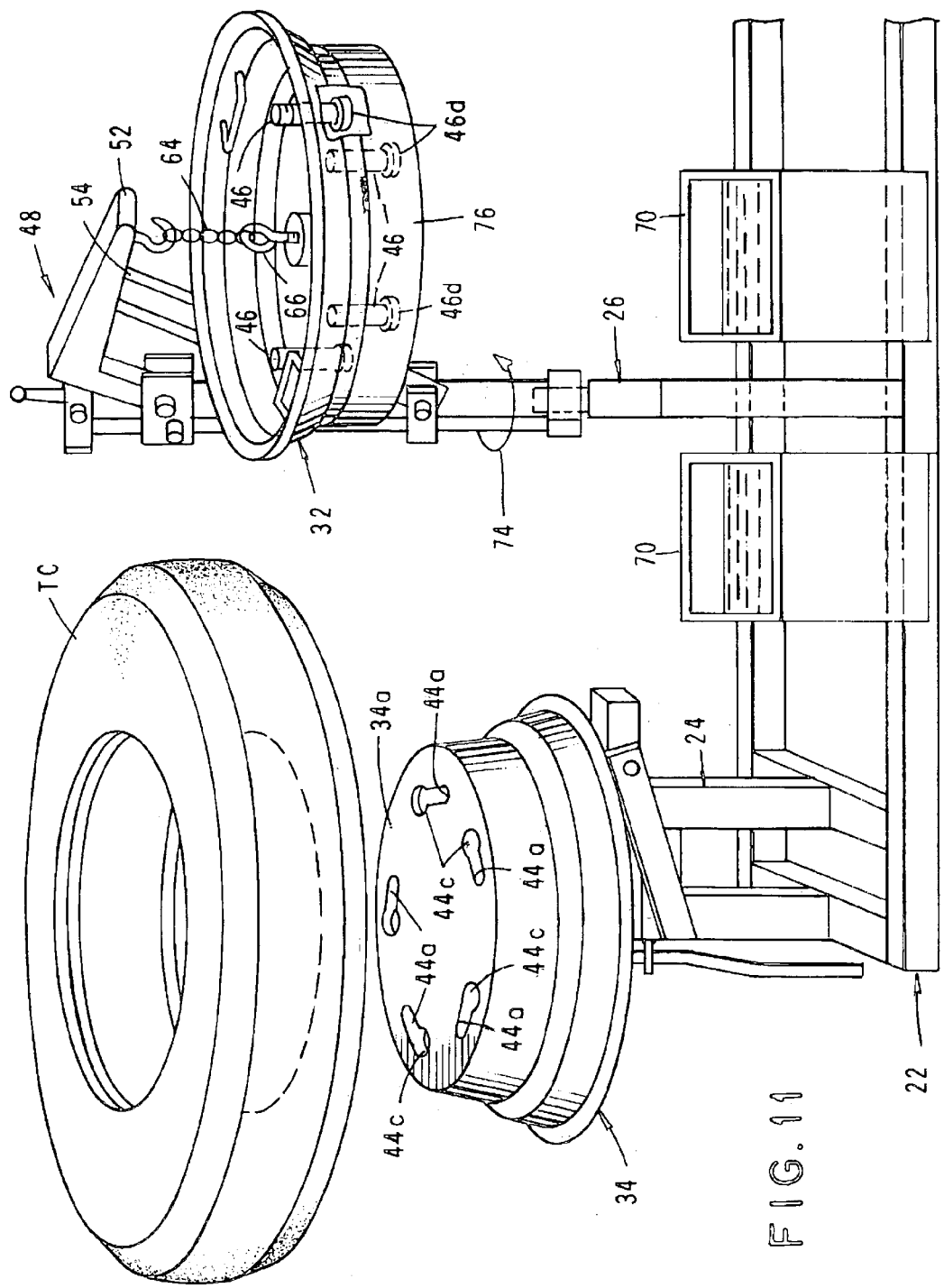
FIG. 11 is a generally perspective view similar to FIG. 10 showing the upper portion of the wheel assembly having been lifted and rotated out of alignment with the lower portion of the wheel assembly.

As illustrated in FIG. 1, lifting means are carried by second support 26 of the support base for lifting the upper portions of the differently sized wheel assemblies and for moving them into and out of alignment with the lower portions of the wheel assemblies in the manner illustrated in FIGS. 10 and 11. In the present form of the invention, the lifting means comprises a lifting mechanism 48 that is rotatably carried by second or central support 26. Lifting mechanism assembly 54, includes as a part thereof an air cylinder assembly 54a that is of a conventional construction. In the present form of the invention, the air cylinder assembly 54a comprises a piston 54b that is reciprocally movable within the air cylinder and a connecting rod 54c that is connected to piston 54b (see FIG. 10). Air cylinder 54a is appropriately connected to by a source of air S via a air line 56 and conventional valving, which is of a character well known to those skilled in the art, is provided to control the flow of the air toward the air cylinder (FIG. 1).

As illustrated in FIG. 10, a connecting yoke 60, which is connected to connecting rod 54c, functions to interconnect the hydraulic cylinder with the lifting arm 52 which is, in turn, pivotally connected to second support 26. Also connected to lifting arm 52 is a generally U-shaped connecting element 62 to which a length of chain 64 is appropriately connected. In the manner shown in FIG. 10, chain 64 can be releasably interconnected with a lifting member such as an eyebolt 66 that is provided on the upper portion 32 of the wheel assembly. The length of chain 64 here comprises one form of the means for interconnecting the connecting element 62 with the lifting member 66. The manner of operation of the lifting means of the invention will be described in greater detail in the paragraphs which follow.

Also connected to lifting arm 52 is a second strut assembly 58 which is in the nature of a readily commercially available, conventional type of damping unit that is adapted to damp the movement of the lifting arm relative to the wheel assembly.

Also comprising a part of the apparatus of the invention is inflation means, which is carried by support base 22 for controllably inflating the tubeless tire when the tire is in position between the upper and lower wheel flanges of the wheel assemblies in the manner illustrated in FIG. 13. As shown in FIG. 13 the invention here comprises an inflation system that includes a valve assembly 68 which is connected to the upper portion 32 of the wheel assembly and a source of air "SA" for supplying pressurized air to the valve stem. Further details of the construction and operation of the inflation means of the invention of will be discussed in the paragraphs, which follow.

As been seen in FIG. 1 a pair of emersion tanks 70 are positioned on either side of central support 26 for receiving at least a portion of the inflated tire when the first and second supports of support base 22 are pivoted into their second position (see for example FIG. 15). As will presently be described, emersion tanks 70 are used to accomplish the visual tire leak checking step of the invention.

Figure 4:
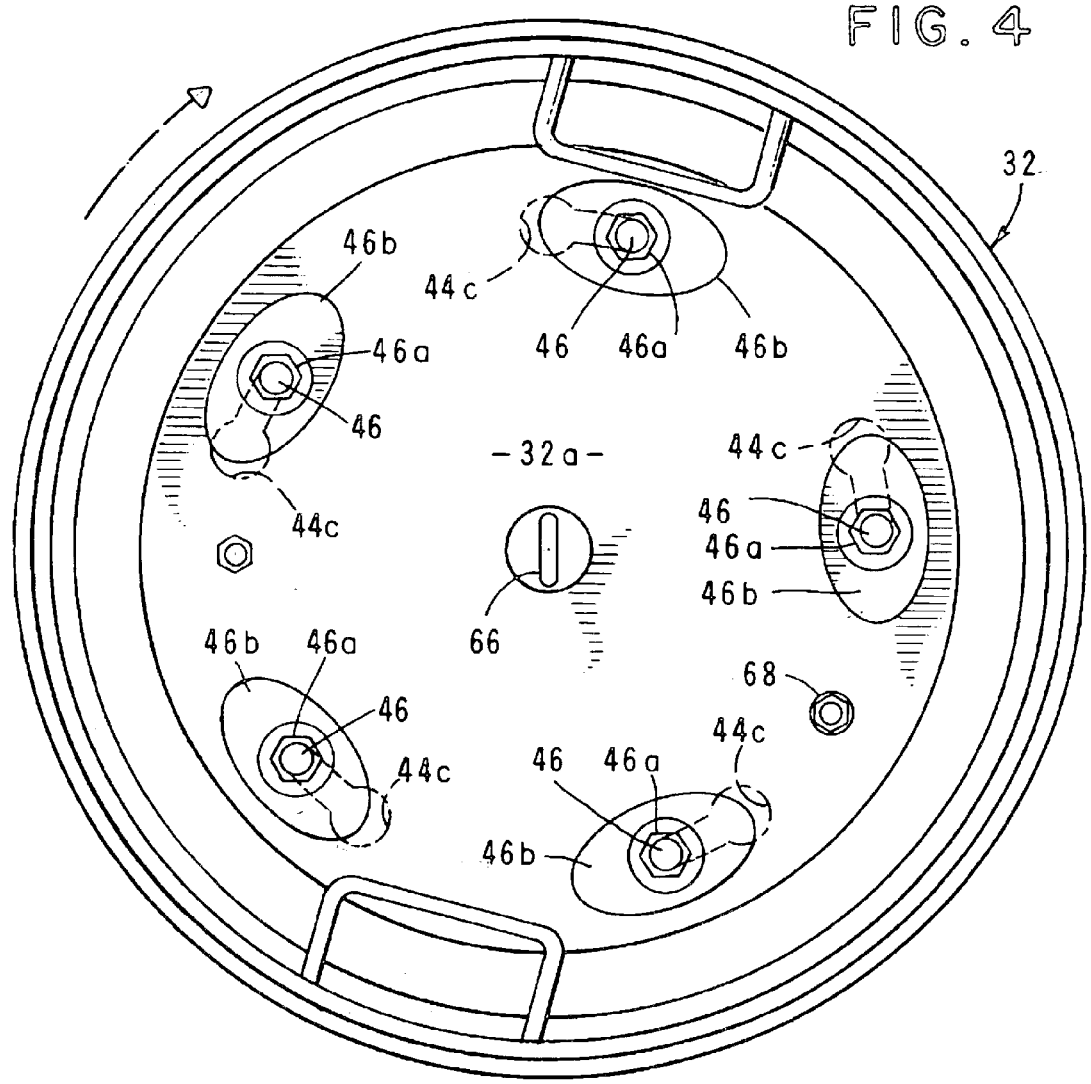
FIG. 4 is a view taken along lines 4—4 of FIG. 2.
Figure 9:
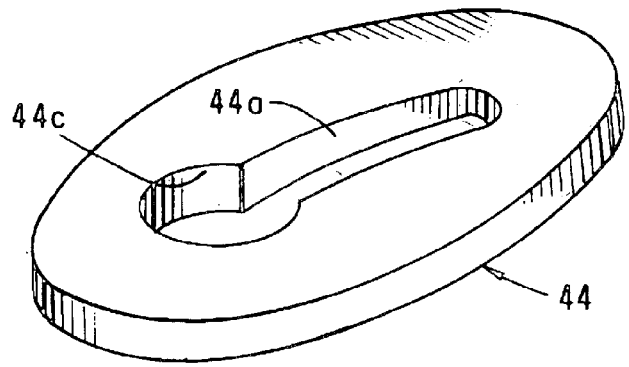
FIG. 9 is a generally perspective view of one of the connector brackets of the connector assemblies of the invention.

In using the apparatus of the invention to conduct the desired tire inspections, the first step in the testing operation is to rotate the upper wheel portion 32 from the locked position shown in FIGS. 4, 7, and 8 to the unlocked position shown in FIG. 6 wherein the head portions 46d of the threaded studs 46 are aligned with the enlarged diameter portions 44c of the key holes. In this unlocked position it is apparent that the upper wheel portion can be separated from and lifted vertically relative to the second portion 34. To accomplish this lifting operation, the lifting arm 52 of the lifting means is moved from the upraised position shown in FIG. 1 to the lowered position shown in FIG. 10. This controlled movement of the lifting arm 52 is accomplished through operation of the first hydraulic assembly 54. With the lifting arm in the second, lowered position, the chain 64, which is connected to the U-shaped bracket 62, can be connected at its opposite end with the eyebolt connector 66, which is interconnected with upper wheel portion 32. With the lifting chain 54 thusly interconnected, the lifting arm 52 can be raised by means of the air cylinder assembly 54 causing the upper wheel portion 32 to vertically separate from the lower wheel portion 34. With the wheel portion 32 in a raised position, the lifting means can be rotated in the direction of the arrow 74 of FIG. 11 to move the upper wheel portion 32 away from and out of alignment with the lower wheel portion 34 in the manner illustrated in FIG. 11. With the upper wheel portion thusly raised and rotated, the tire casing "TC" can be positioned over the lower wheel portion 34 in the manner indicated in FIGS. 11 and 12.

Once the tire casing "TG" has been positioned over the lower wheel portion 34, the lifting means can be rotated back to its starting position and the lifting arm 52 can be controllably lowered to bring the upper wheel portion 32 into mating engagement with the lower wheel portion 34. As the upper wheel portion is lowered relative to the second wheel portion, a generally cylindrical skirt 76, which is interconnected with upper wheel portion 32 as by welding (see FIG. 14), will guide the travel of the upper wheel portion downwardly in the manner shown by the phantom lines in FIG. 12. As the upper wheel portion is lowered, the head portions 46d of the threaded studs will pass through the enlarged diameter portions 44a of the key hole opening 44a. When the upper wheel portion 32 reaches the fully lowered position shown in FIG. 13, it can be rotated in a manner to cause the head portions 46d of the threaded studs to pass beneath the reduced diameter neck portions of the key hole openings 44a that are provided in plate (see FIGS. 7 and 8).

Figure 12:
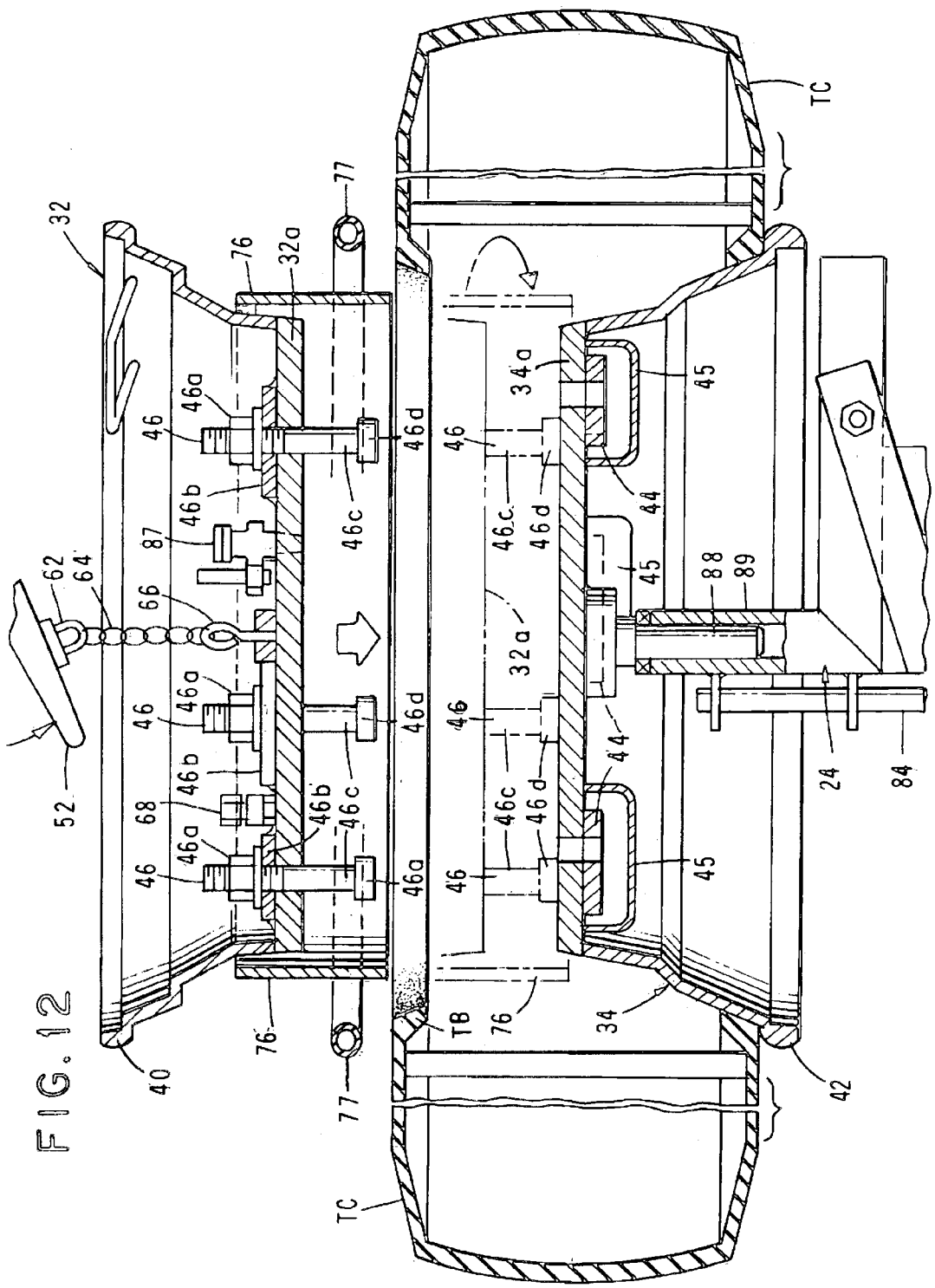
FIG. 12 is an enlarged, cross-sectional view showing the tire casing resting on the lower portion of the wheel assembly and illustrating the step of lowering the upper portion of the wheel assembly into engagement with the lower portion of the wheel assembly.
Figure 16:
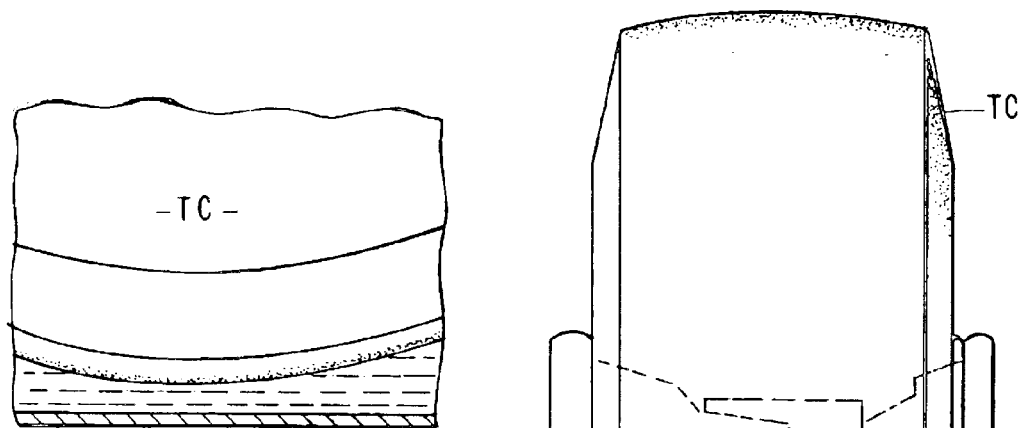
FIG. 16 is a cross-sectional view taken along lines 16—16 of FIG. 15.

With the upper wheel portion reconnected with the lower wheel portion and the tire casing "TC" positioned between the wheel portions, the inflation step for inflating the tire casing can begin. The first step in this process is to place an auxiliary sealing means, shown here as a generally annular-shaped, inflatable tube 77, over the upper wheel portion 32 (FIG. 12). In a manner presently to be described, this annular shaped sealing means functions to impede the escape of air between the first tire bead "TB" of the tire casing and the upper wheel flange 40 against which the upper tire bead seats. With the sealing means in position, the tire casing is inflated through use of the inflation means of the invention, which here comprises an inflation system that includes the previously identified valve assembly 68 which is carried by the upper portion 32 of the wheel assembly and is connected, via an appropriate air hose 79, with a source of air "SA" for supplying pressurized air to the valve stem (FIG. 13). As the air under pressure flows through valve assembly 68, it will travel in the direction of the arrows 81 of FIG. 13, through an air passageway 83 formed in the wheel assembly, past the skirt 76 and into the interior of the tire casing in the manner indicated by the arrows. A continued flow of air under pressure through the inflation valve and into the casing will cause the casing to inflate and appropriately seal against the upper and lower wheel flanges in the manner shown in FIG. 13.

Once the tire casing has been filled with air, the defect detection operation can commence. This operation is accomplished by first pivoting the entire wheel assembly and inflated tire from the position shown in FIG. 13 to the position shown in FIG. 15 wherein the tire casing is in a generally vertical orientation. As the assembly moves into the vertical orientation, the lower portion of the tire casing will move into the water or other suitable liquid contained within the water tank 70 and will be immersed in to the liquid in the manner shown in FIG. 15. A lifting bar 84 is provided to assist the operator in moving the tire and wheel assembly from the generally horizontal configuration shown in FIG. 13 into the generally vertical leak test position shown in FIG. 15.

With the tire and wheel assembly in the position shown in FIG. 15, the assembly can be rotated about a horizontal axis 86 (FIG. 15), which is the axis of a shaft 88 that is connected to wheel portion 34 and rotates within a journal 89 (FIG. 13), and, as the tire casing rotates through the liquid contained within tank 70, any defects in the tire casing can be located by observing a series of air bubbles "AB" (FIG. 15) that are formed in the liquid contained within the immersion tank 70. With this clear visual indication of a leakage of air through a defect in the tire casing, the defect can be precisely pin pointed and appropriately marked. It is apparent that, if more than one defect exists in the tire casing, each of the several defects can be identified in a similar manner by slowly rotating the tire casing through the liquid contained within the water tank.

Once all of the defects in the tire casing have been identified and marked, the wheel and tire assembly can be, once again, pivoted into the generally horizontal starting configuration shown in FIG. 13. With the assembly in this position, air within the tire casing can be released to atmosphere through operation of a conventional relief valve assembly 87 that is carried by upper wheel portion 32 (FIG. 14). Once the tire casing has been deflated, the upper wheel portion 32 can be rotated relative to the lower wheel portion 34 so as to bring the heads 46d of the threaded bolts into index with the enlarged diameter portion 44c of the key hole. With the upper wheel portion in this position, the lifting means can be once again be used in the manner previously described to lift the upper wheel assembly relative to the lower wheel assembly and rotate it into position shown in FIG. 11 so as to permit removal of the tire casing "TC" from the lower wheel portion 34.

It is apparent that additional tire casings of the first size can be checked using the wheel assemblage mounted on support 24. Similarly, larger tire casings can be checked in the manner described in the preceding paragraphs using the larger wheel assembly that is mounted on support 28 of the apparatus. As previously mentioned, the configuration of this second wheel assembly and its method of operation is identical to that described in connection with the configuration and operation of the first wheel assembly.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A tire inspection apparatus for locating defects in tubeless tires having sidewalls and upper and lower annular tire beads comprising:

(a) a support base comprising first and second supports, said first support being pivotally movable from a first position to a second position;

(b) a wheel assembly rotatably supported on said first support of said support base, said wheel assembly having a first portion and a removably interconnected, axially aligned second portion, said second portion having a lower wheel flange against which the lower tire bead seats and said first portion having an first wheel flange against which the upper tire bead seats;

(c) connector means provided on said wheel assembly for removably interconnecting together said first and second portions thereof, said connecting means comprises:

(i) a plurality of circumferentially spaced-apart connector brackets connected to said second wheel portion each said connector brackets having a generally keyhole-shaped opening provided therein; and (b) a valve stem assembly connected to said first portion of said wheel assembly; and (c) an air hose interconnecting said source of said with said valve stem.

2. The apparatus as defined in claim 1 in which said inflation means comprises:

(a) a source of air under pressure;

keyhole-shaped openings provided in said plurality of circumferentially spaced-apart connector brackets;

(d) lifting means rotatably connected to said second support of said support base for lifting said first portion of said wheel assembly and for moving said first portion of said wheel assembly into and out of alignment with said second portion of said wheel assembly, said lifting means being rotatable between first and second positions;

(e) inflation means carried by said support base for inflating the tubeless tire when the tire is positioned between said first and second portions of said wheel assembly to form an inflated tire; and (f) an emersion tank positioned proximate said the first support of said support base for receiving at least a portion of said inflated tire when said first support of said support base is pivoted into its second position.

3. The apparatus as defined in claim 1 in which said lifting means comprises:

(a) a lifting arm rotatably connected to said second support, said lifting arm including a connecting element; and (b) an air cylinder assembly connected to said second support and to said lifting arm, said air cylinder assembly comprising an air cylinder, a piston reciprocally movable within said air cylinder and a connecting rod connected to said piston.

4. The apparatus as defined in claim 3, further including a lifting member connected to said first portion of said wheel and means for interconnecting said connecting element of said support arm with said lifting member.

5. A tire inspection apparatus for locating defects in tubeless tires having sidewalls and upper and lower annular tire beads comprising:

(a) a support base comprising first and second supports, said first support being pivotally movable from a first position to a second position;

(b) a wheel assembly rotatably supported on said first support of said support base, said wheel assembly having a first portion and a removably interconnected, axially aligned second portion, said second portion having a lower wheel flange against which the lower tire bead seats and said first portion having an upper wheel flange against which the upper tire bead seats;

(c) connector means provided on said wheel assembly for removably interconnecting together said first and second portions thereof, said connector means comprising (i) a plurality of circumferentially spaced-apart connector brackets connected to a selected one of said first and second wheel portions, each of said connector brackets having a generally keyhole-shaped opening provided therein; and (ii) a plurality of circumferentially spaced-apart studs connected to the other of said first and second wheel portions, each of said studs having a head portion receivable within a selected one of the generally (ii) a plurality of circumferentially spaced-apart studs connected to said first wheel portion, each of said studs having a head portion receivable within a selected one of the generally keyhole-shaped openings provided in said plurality of circumferentially spaced-apart connector brackets;

(d) lifting means carried by said second support of said support base for lifting said first portion of said wheel assembly and for moving said first portion of said wheel into and out of alignment with said second portion of said wheel;

(e) inflation means carried by said support base for inflating the tubeless tire to form an inflated tire when the tire is positioned between said first and second portions of said wheel assembly; and (f) an emersion tank positioned proximate said the first support of said support base for receiving at least a portion of the inflated tire when said first support of said support base is pivoted into its second position.

6. A tire inspection apparatus for locating defects in tubeless tires having sidewalls and upper and lower annular tire beads comprising:

(a) a support base comprising first, second, and third supports, said first and third supports being pivotally movable from a first position to a second position;

(b) a first wheel assembly rotatably supported on said first support of said support base and a second wheel assembly rotatably supported on said third support of said support base, each of said first and second wheel assemblies having a first portion and a removably interconnected, axially aligned second portion, said second portion having a lower wheel flange against which a lower tire bead seats and said first portion having an upper wheel flange against which the upper tire bead seats;

(c) connector means provided on each of said first and second wheel assemblies for removably interconnecting together said first and second portions thereof, said connector means comprising:

(i) a plurality of circumferentially spaced-apart connector brackets connected to a selected one of said first and second wheel portions of each of said first and second wheel assemblies, each of said connector brackets having a generally keyhole-shaped opening provided therein; and (ii) a plurality of circumferentially spaced-apart studs connected to the other of said first and second wheel portions of each of said first and second wheel assemblies, each of said studs having a head portion receivable within a selected one of the generally keyhole-shaped openings provided in said plurality of circumferentially spaced-apart connector brackets;

(d) lifting means rotatably connected to said second support of said support base for lifting said first portions of each said first and second wheel assemblies and for moving said first portion of each said first and second assemblies wheel into and out of alignment with said second portion of each of said first and second wheel assemblies, said lifting means being rotatable between first and second positions;

(e) inflation means carried by said support base for inflating the tubeless tire when the tire is positioned between said first and second portions of each of first and second wheel assemblies to form an inflated tire; and (f) first and second emersion tanks positioned proximate said first support of said support base for receiving at least a portion of said inflated tires when said first and third supports of said support base are pivoted into their second position.

7. The apparatus as defined in claim 6 in which said inflation means comprises a valve stem assembly connected to said first portion of each of said first and second portions of said wheel assemblies and a source of air for supplying pressurized air to said valve stem.

8. The apparatus as defined in claim 6 in which said first portion of each said first and second wheel assemblies include a lifting member and in which said lifting means comprises:

(a) a lifting arm connected to said second support; and (b) a hydraulic assembly connected to said second support and to said lifting arm, said hydraulic assembly comprising a hydraulic cylinder, a piston reciprocally movable within said hydraulic cylinder and a connecting rod connected to said piston.

9. The apparatus as defined in claim 8 in which said lifting means further comprises a connecting element connected to lifting arm, said connecting element being releasably interconnected with said lifting member provided on said upper portion of said wheel.

10. The apparatus as defined in claim 9 in which said lifting means further comprises a damping unit interconnected with said lifting arm for damping movement of said lifting arm relative to said first and second wheel assemblies.

* * * * *